United States Patent Office 3,825,657
Patented July 23, 1974

3,825,657
PROCESS FOR THE CRACKING OF SULFURIC ACID
Ernst Jenniges, Cologne-Hohenberg, Germany, assignor to Chemiebau Dr. A. Zieren GmbH & Co., K.G., Cologne, Germany
Filed July 29, 1971, Ser. No. 167,231
Claims priority, application Germany, July 29, 1970, P 20 37 619.6
Int. Cl. C01b *17/58*
U.S. Cl. 423—540                      9 Claims

ABSTRACT OF THE DISCLOSURE

In the cracking of waste sulfuric acid to produce $SO_2$-containing gases devoid of impurities deleterious to $SO_3$ conversion, the waste acid containing about 30–60% by weight $H_2SO_4$ is concentrated to about 60–75% by weight $H_2SO_4$ prior to cracking, the latter step being improved from the standpoint of energy consumption by passing the cracking gases having a temperature of about 1000° C. in direct contact with the 30–60% by weight acid to evaporate water therefrom.

The cracking gases are then cooled to condense out water and impurities. Organic impurities are scrubbed out of the resultant gas with $H_2SO_4$, the latter, when loaded with impurities being passed to the cracking stage. Residual $SO_2$ contained in the condensed out water is entrained by an air stream, and the resultant $SO_2$ plus air is used as combustion air in the cracking stage.

BACKGROUND OF THE INVENTION

This invention relates to a system for the cracking of by-product or waste aqueous 30–60% by weight sulfuric acid to produce $SO_2$-containing gases.

In several chemical processes, e.g., in the production of methyl methacrylate, there is obtained a by-product aqueous sulfuric acid stream containing 30–60% by weight of $H_2SO_4$ and impurities. In certain cases, for reasons of economy, this stream must be worked up into concentrated sulfuric acid and reused. Since impurities contained therein, such as, for example, hydrocarbons, sulfonic acids, ammonium salts, must be removed from the acid, it is not sufficient to concentrate the aqueous sulfuric acid to 98% $H_2SO_4$ by simple water evaporation. Instead, the waste sulfuric acid is cracked, at temperatures of between 900 and 1200° C., into $SO_2$ and steam under such conditions that the impurities of the acid are oxidized to carbon dioxide, water and nitrogen. The $SO_2$-containing gases are then converted to concentrated sulfuric acid by the contact method for example.

The economics of the acid cracking procedure is dependent on the concentration of the waste sulfuric acid. Since additional fuel is required for the water vaporization and for the superheating of the steam to about 1000° C., the less water there is to treat, and the less costly the process. Consequently, waste sulfuric acids having less than 60% by weight of $H_2SO_4$ have been concentrated by evaporation, generally to concentrations of 65–75% by weight of $H_2SO_4$, an immersion burner being employed, for example, to evaporate the water. This mode of operation has high energy requirements because considerable quantities of fuel are consumed for the concentration step with the immersion burner, as well as for the cracking step.

SUMMARY OF THE INVENTION

A principal object of this invention is to provide a process for the cracking of aqueous, contaminated waste sulfuric acid at a minimum fuel consumption.

A particular object is to produce an $SO_2$-containing gas which can be converted to concentrated sulfuric acid in a conventional manner.

Another object is to provide apparatus for conducting the processes of this invention.

Upon further study of the specification and appended claims, other objects and advantages of the present invention will become apparent.

To attain these objects water is evaporated from the aqueous sulfuric acid generally containing about 30–60% by weight $H_2SO_4$ by direct heat exchange with cracking gases having a temperature of 900–1100° C., as obtained from the cracking stage which is operated at 900–1200° C. The resultant acid concentrated to 60–75% by weight of $H_2SO_4$ is then passed to the cracking process. In this manner, the heat of the hot cracking gases is economically utilized for the vaporization of the water from the dilute acid, so that no external energy is required for the concentration of the acid. The concentration according to this invention can be conducted for example, in a tower through which the hot cracking gases flow in the upward direction, while the acid to be concentrated is sprayed at the head of the tower. With a single passage of the acid through such a tower, an acid is obtained having the concentration required for the cracking step.

It is preferred that the contaminated aqueous sulfuric acid be preheated to 40–100° C. prior to entering the concentrating stage, by heat exchange with concentrated acid from the concentrating stage. Furthermore, in the concentrating stage, it is preferred that the cracking gases be cooled from the cracking temperature of 1000° C. for example, to a temperature of 100–350° C. This latter temperature of the cracking gases exiting the concentrating stage has a bearing on the steam content of the exiting cracking gas. This steam content must be so high that the entire water entrained into the process with the aqueous waste sulfuric acid is removed by the cracking gas. The cracking gas entering the concentrating stage contains already the water vaporized from the 60–75% by weight $H_2SO_4$ in the cracking step. In the concentrating stage the gas absorbs further water vapor corresponding to concentration increase from 30–60 to 60–75% by weight $H_2SO_4$. Therefore the cracking gas temperature at the exit of the concentrating stage must be selected high enough to carry away all water and to avoid water condensation at the colder exit part of this stage.

After passing through the concentrating stage, the cracking gases are suitably cooled and then scrubbed with sulfuric acid (of about 0.1 to 10% by weight $H_2SO_4$), and the resultant sulfuric acid from this scrubbing stage can be fed to the cracking stage together with the concentrated waste acid. By first cooling the cracking gases to about 30–40° C., the steam contained in the gases is condensed. By the subsequent scrubbing with sulfuric acid, the steam content of the gas is further reduced, and any volatile organic compounds which may have been transferred to the cracking gas in the concentrating stage are scrubbed out. After passing through the cooling and scrubbing stages and then through an EGR purifier, the cracking gas is available for conversion into pure concentrated sulfuric acid. (EGR is an abbreviation for Elektrostatische Gas- Reinigung which means gas purification by electrostatic mist precipitation.)

The water condensed out of the cracking gas still contains $SO_2$ and some $H_2SO_4$. In order to remove the $SO_2$, the solution can be treated with air in a stripping column. This $SO_2$-laden air can either be added to the cracking gas prior to the cooling step, or utilized as combustion air during the cracking step.

This invention is particularly applicable to the treatment of waste sulfuric acid containing 20% to 50%, preferably 25% to 40% by weight of impurities such as hydrocarbons, sulfonic acids, and ammonium salts. Whereas the invention is most applicable to waste acids containing 30–60% by weight of sulfuric acids, it is also beneficial for the treatment of acids containing higher or lower amounts, e.g., 25% to 60% by weight $H_2SO_4$.

BRIEF DESCRIPTION OF THE PREFERRED EMBODIMENT

DETAILED DESCRIPTION OF THE PREFERRED EMBODIMENT

Figure 1:
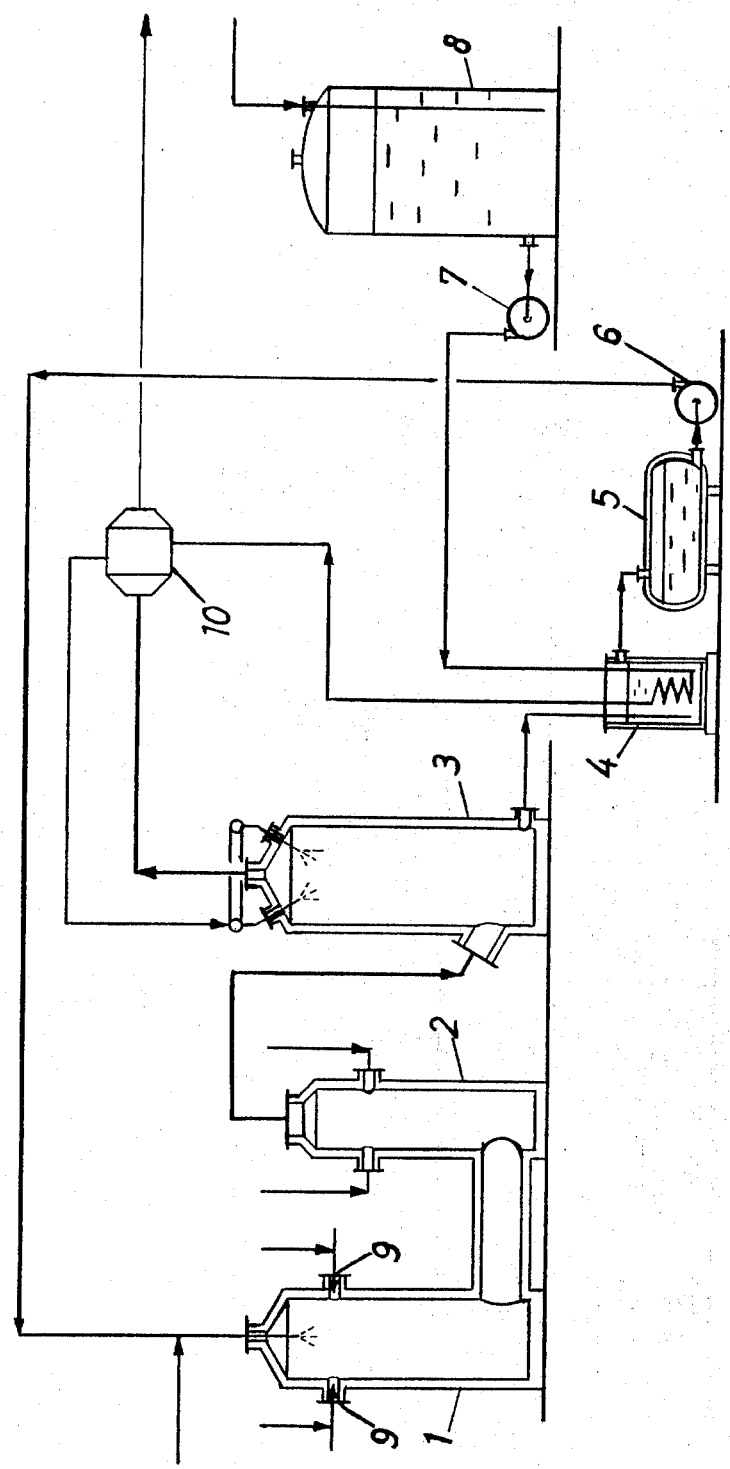
FIG. 1 is a schematic flowsheet of a plant for conducting the process of this invention.

According to FIG. 1, the plant for cracking aqueous waste sulfuric acid comprises a cracking furnace 1 directly connected to an afterburner chamber 2 and a concentrator 3 disposed downstream thereof. The plant further comprises a storage tank 8 for the aqueous waste sulfuric acid to be cracked connected upstream with respect to the acid side of the concentrator 3. There is also a heat exchanger 4 connected downstream of the acid side of the concentrator for cooling the concentrated acid and preheating the waste acid. Associated with the heat exchanger 4 is a receiver 5 for collecting cooled concentrated acid, and a pump 6 for delivering the latter acid to the cracking stage.

The aqueous contaminated waste sulfuric acid is transferred by means of pump 7 from the tank 8 through the heat exchangers 4 and 10 to the head of the concenerator 3. In the heat exchangers 4 and 10, the acid is heated from 20° C. to about 100° C. This preheated acid is sprayed into the gas space in the head of the concentrator 3. During this step, the acid comes into direct contact with the upwardly moving cracking gases having a temperature of about 1000° C., a substantial portion of the water content of the acid being vaporized and transferred to said cracking gases. At the bottom of the concentrator, there is recovered an aqueous acid containing 70% by weight of $H_2SO_4$ at a temperature of 160° C. This hot, concentrated acid is used to preheat the dilute acid in the heat exchanger 4. During this step, the acid is cooled to about 80° C. and is introduced through nozzles into the cracking furnace 1 at this temperature. In the cracking furnace 1, the required cracking temperature of 900–1100° C. is produced by burners 9 arranged in the wall. The burners 9 are operated, for example, with natural gas; however, it is also possible to employ a fuel oil, particularly a sulfur-containing fuel oil. The cracking gases flow into an afterburner chamber 2 fed with air so that, after passing through the chamber, no combustible substances remain in the cracking gas. Thereafter, the gas enters the concentrating tower 3 at a temperature of about 1000° C.

Figure 2:
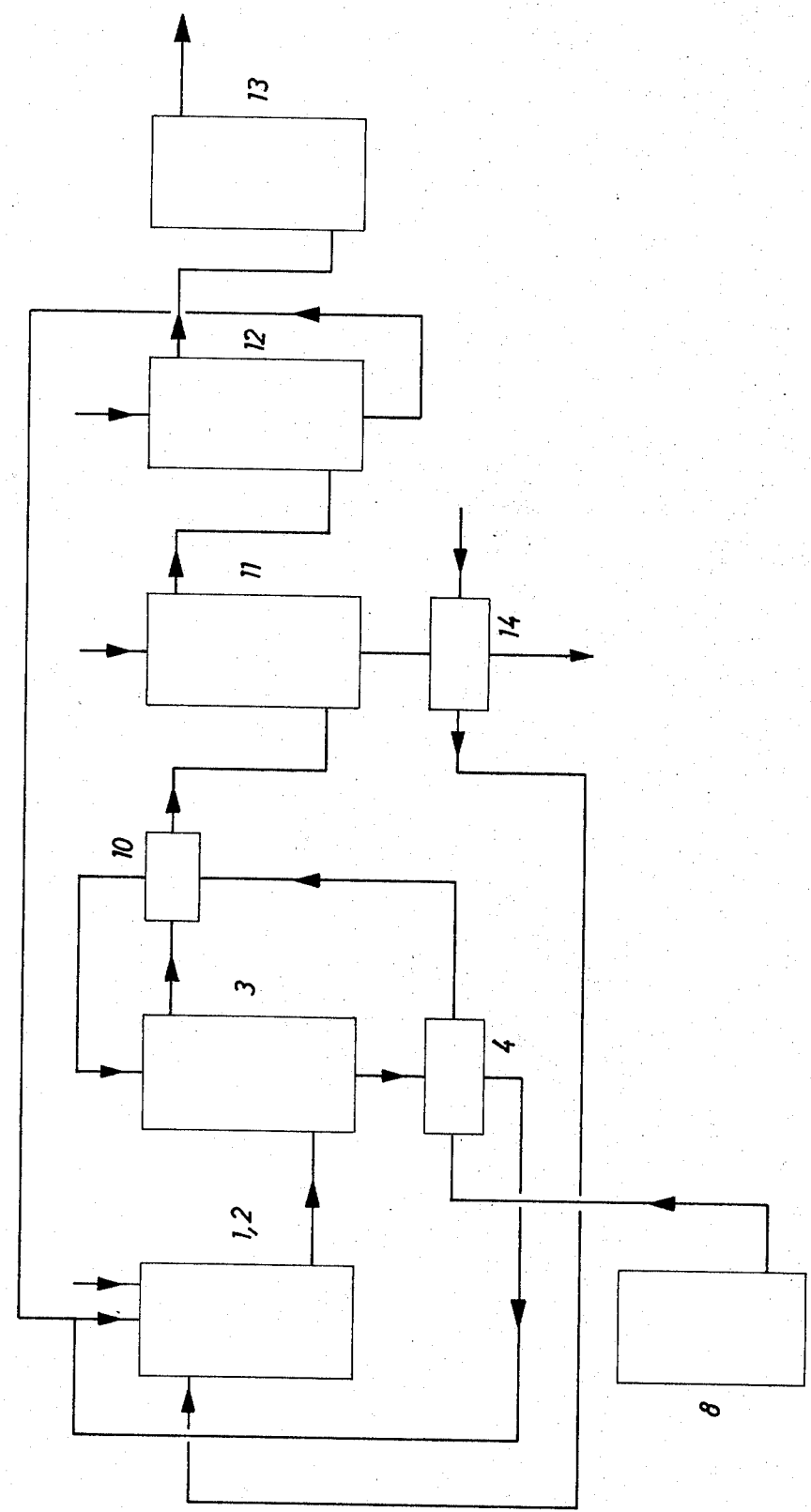
FIG. 2 is a block flowsheet illustrating further apparatus to be used in conjunction with the process of FIG. 1.

The second sheet of the drawings (FIG. 2) is more specific insofar as it illustrates the unit 11 condensing water from the cracking gas, the attached stripping column 14 with stripping air line to the cracking furnace 1, 2, the scrubbing unit 12 with scrubber acid line to the cracking furnace 1, 2 and the subsequent EGR-plant 13.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 2250 kg./h. of waste sulfuric acid containing 32% by weight of $H_2SO_4$ at a temperature of 20° C. is first preheated to 50° C. in heat exchange with the acid exiting from the concentrator at 140° C., the preheated acid is then concentrated with cracking gases having a temperature of 1000° C. During this step, about 1000 kg./h. of 70% by weight sulfuric acid is obtained at a temperature of 140° C. This concentrated acid is cooled in heat exchange with the dilute acid to 80° C., and then cracked in the cracking furnace at 1000° C. into $SO_2$ and steam, the organic impurities being converted to $CO_2$ and water. The cracking furnace consumes about 200 $Nm.^3$/h. of methane, corresponding to 1.74·10$^6$ Kcal. per hour. The cracking gas, cooled to about 120° C. in the concentrator, is fed, via a gas purifying device, to a sulfuric acid contact plant. The condensate water from the gas purifying stage is purged with air to remove residual $SO_2$ and the $SO_2$-containing air is fed to the cracking furnace as combustion air. By this mode of operation, 2500 $Nm.^3$/h. of cracking gas is obtained with a content of about 6% by volume of $SO_2$.

COMPARATIVE EXAMPLE OF PRIOR ART PROCESS 2250 kg./h. of 32% by weight waste sulfuric acid is first evaporated in an immersion burner to 70% by weight of $H_2SO_4$. For this purpose, about 135 $Nm.^3$/h. of methane is required, corresponding to 1.17·10$^6$ Kcal./h. In this way there is obtained about 1000 kg./h. of 70% strength acid which is then cracked in the cracking furnace with the use of 200 $Nm.^3$/h. of methane, corresponding to 1.74·10$^6$ Kcal./h. as the heating medium. The cracking gas, available at approximately 1000° C. at the outlet of the afterburner chamber is cooled, in a waste heat boiler, to only about 350° C. to avoid dew point corrosion; during this step, 1120 kg./h. of steam is obtained, corresponding to about 0.75·10$^6$ Kcal./h. The thus-cooled waste gas is fed, as done in the preceding example, to a sulfuric acid contact plant via a gas purifier. The $SO_2$ contained in the condensate water is likewise recycled into the cracking process. After cooling, 2500 $Nm.^3$/h. of cracking gas is obtained with about 6% by volume of $SO_2$.

A comparison of both examples shows a decrease of 0.42·10$^6$ Kcal./h. with the process according to the invention. Moreover, waste heat boiler and immersion burner plant are together more expensive than the concentrating stage in the process of the invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the substantially complete cracking of impure sprayable aqueous sulfuric acid containing about 30–60% by weight of $H_2SO_4$ at temperatures of between 900 and 1200° C. into essentially only hot cracking gases containing $CO_2$, $H_2O$, $N_2$ and $SO_2$ and wherein the 30–60% $H_2SO_4$ is concentrated to about 60–75% $H_2SO_4$ prior to the cracking stage; the improvement comprising conducting the concentrating stage by passing said cracking gases having a temperature of 900–1100° C. in direct contact with the 30–60% $H_2SO_4$ to evaporate water therefrom, and cool said cracking gases to a temperature of 100–350° C., said concentrating stage being conducted in a zone separate and distinct from where said cracking stage is conducted.

2. A process according to Claim 1, wherein the impure aqueous 30–60% sulfuric acid is preheated to 40–100° C. before entering the concentrating stage, by indirect heat exchange against hot concentrated acid obtained from the concentrating stage.

3. A process according to Claim 1 further comprising the steps of recovering the cracking gases from the concentrating stage, cooling same to condense out water, and scrubbing resultant cracking gas with sulfuric acid $H_2SO_4$ of about 0.1–10% by weight to remove organic impurities therefrom.

4. A process according to Claim 3 further comprising passing resultant $H_2SO_4$ loaded with organic impurities to the cracking stage.

5. A process according to Claim 4 further comprising passing air through the condensed-out water to remove dissolved $SO_2$ therefrom, and passing resultant gaseous mixture to the cracking stage for use as combustion air.

6. A process according to Claim 4 further comprising passing air through the condensed-out water to remove dissolved $SO_2$ therefrom, and passing resultant gaseous mixture to the cracking stage for use as combustion air.

7. A process as defined by Claim 1, said impure sulfuric acid containing 20–50% by weight of impurities selected from the group consisting of hydrocarbons, sulfonic acids, and ammonium salts.

8. A process as defined by Claim 1, wherein said direct contact is conducted by spraying said 30–60% $H_2SO_4$ countercurrently into said cracking gases having a temperature of 900–1110° C.

9. A process as defined by Claim 1 wherein the impure sulfuric acid contains 32% by weight of $H_2SO_4$.

References Cited

UNITED STATES PATENTS

| | | | |
|---|---|---|---|
| 2,021,725 | 11/1935 | Hechenbleikner | 423—540 |
| 2,564,833 | 8/1951 | Collier | 423—540 X |
| 1,900,239 | 3/1933 | Hechenbleikner | 23—177 S |
| 2,001,359 | 5/1935 | Hechenbleikner | 23—177 S |
| 2,150,750 | 3/1939 | Rogers et al. | 23—177 R |
| 2,789,035 | 4/1957 | Hurlburt | 23—177 S |
| 3,383,171 | 5/1968 | Haeseler et al. | 23—177 R |

JACK COOPER, Primary Examiner

U.S. Cl. X.R.

423—351, 437, 522

UNITED STATES PATENT OFFICE
CERTIFICATE OF CORRECTION

Patent No. 3,825,657        Dated July 23, 1974

Inventor(s) Ernst Jenniges

It is certified that error appears in the above-identified patent and that said Letters Patent are hereby corrected as shown below:

Claim 5, line 1: Change the dependency to --Claim 3--.

Signed and sealed this 5th day of November 1974.

(SEAL)
Attest:

McCOY M. GIBSON JR.
Attesting Officer

C. MARSHALL DANN
Commissioner of Patents